United States Patent [19]

Loppnow et al.

[11] Patent Number: 5,482,098
[45] Date of Patent: Jan. 9, 1996

[54] FEEDING DEVICE FOR CURVED WORKPIECES

[76] Inventors: Dean A. Loppnow, N8619 Ski Slide Rd., Ixonia, Wis. 53036; Dale D. Steffen, W264 N5695 Mountain Meadow Dr., Sussex, Wis. 53089

[21] Appl. No.: 299,843

[22] Filed: Sep. 1, 1994

[51] Int. Cl.⁶ ................................................. B23B 31/00
[52] U.S. Cl. .................... 144/253 B; 83/439; 83/448; 83/450; 144/134 A; 144/253 F; 144/253 J; 144/246 E; 144/246 F; 144/249 R
[58] Field of Search ............................ 83/439, 448, 450; 144/134 R, 134 A, 253 R, 253 B, 253 C, 253 F, 253 J, 246 R, 246 E, 249 R, 249 B, 249 A, 242 R

[56] References Cited

U.S. PATENT DOCUMENTS

| | | | |
|---|---|---|---|
| 1,174,777 | 3/1916 | Tomlinson | 144/253 F |
| 1,563,388 | 12/1925 | Mattison et al. | 144/253 F |
| 2,722,957 | 11/1955 | Marvosh | 144/134 |
| 2,783,796 | 3/1957 | Patterson | 144/249 B |
| 2,821,301 | 1/1958 | Montague | 144/249 B |
| 2,864,415 | 12/1958 | Mayer | 144/246 |
| 3,789,731 | 2/1974 | Loy | 144/253 F |
| 3,858,631 | 1/1975 | Andersson et al. | 144/249 X |
| 4,483,378 | 11/1984 | Chang te al. | 144/246 |
| 4,499,933 | 2/1985 | Thompson | 144/249 R |
| 4,886,099 | 12/1989 | Abreu | 144/117 |
| 5,143,130 | 9/1992 | Bonyman | 144/253 |
| 5,148,847 | 9/1992 | Knerr | 144/357 |

*Primary Examiner*—W. Donald Bray
*Attorney, Agent, or Firm*—Nilles & Nilles

[57] ABSTRACT

A device for feeding a curved workpiece is presented. A shaping device incorporating a feeding device of the present invention comprises a base; a cutting head projecting vertically above the base for shaping the workpiece; and a jig mounted to the base for guiding the workpiece past the cutting head. The jig includes first, second, and third rollers for providing a three point support for the workpiece. Preferably, one of the rollers is motor driven to automatically advance the workpiece past the cutting head. Further, the jig is preferably vertically adjustable and horizontally adjustable. A feeding device is adaptable for installation on standard shaping devices, and it can shape the lateral surfaces of both straight and curved wooden workpieces.

18 Claims, 4 Drawing Sheets

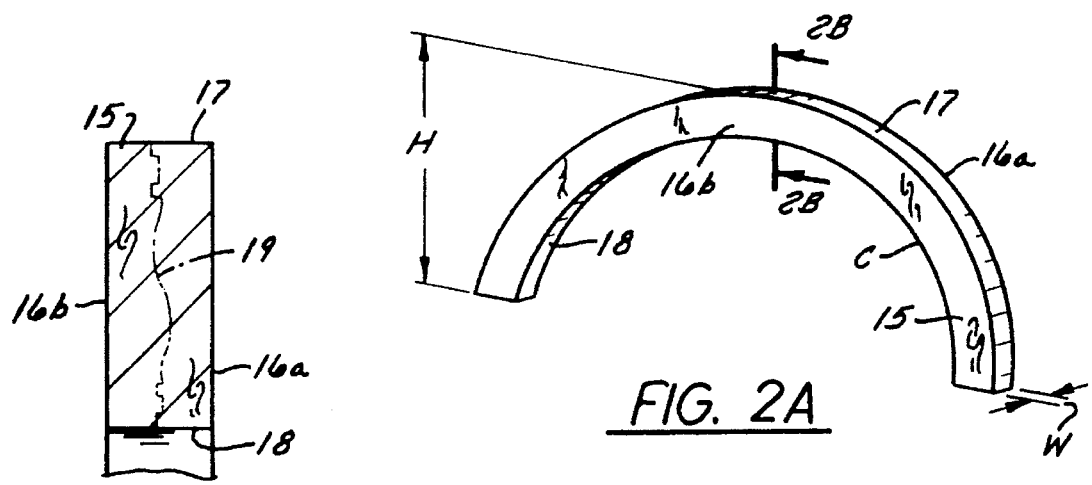
FIG. 2A
FIG. 2B
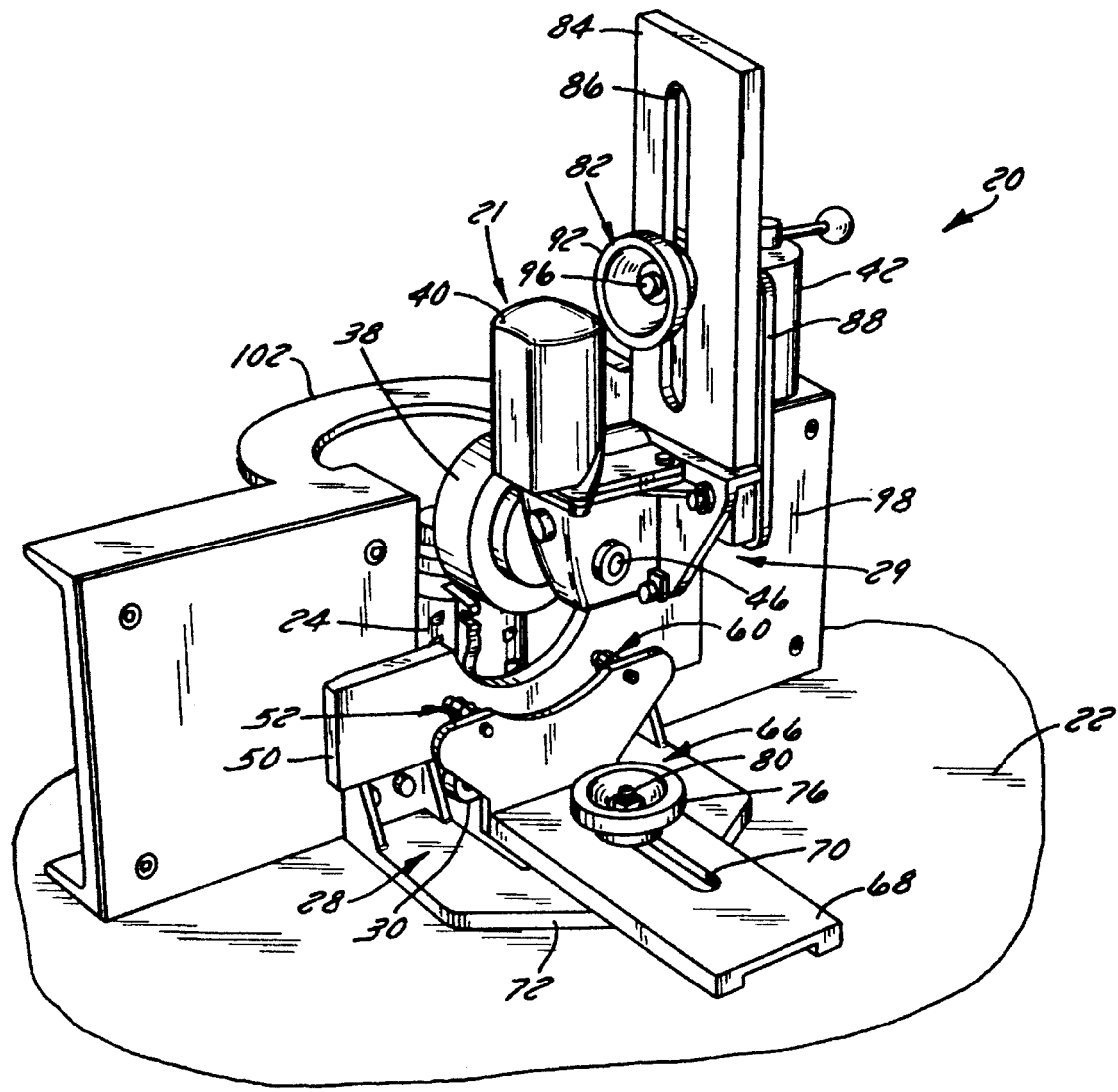
FIG. 3A

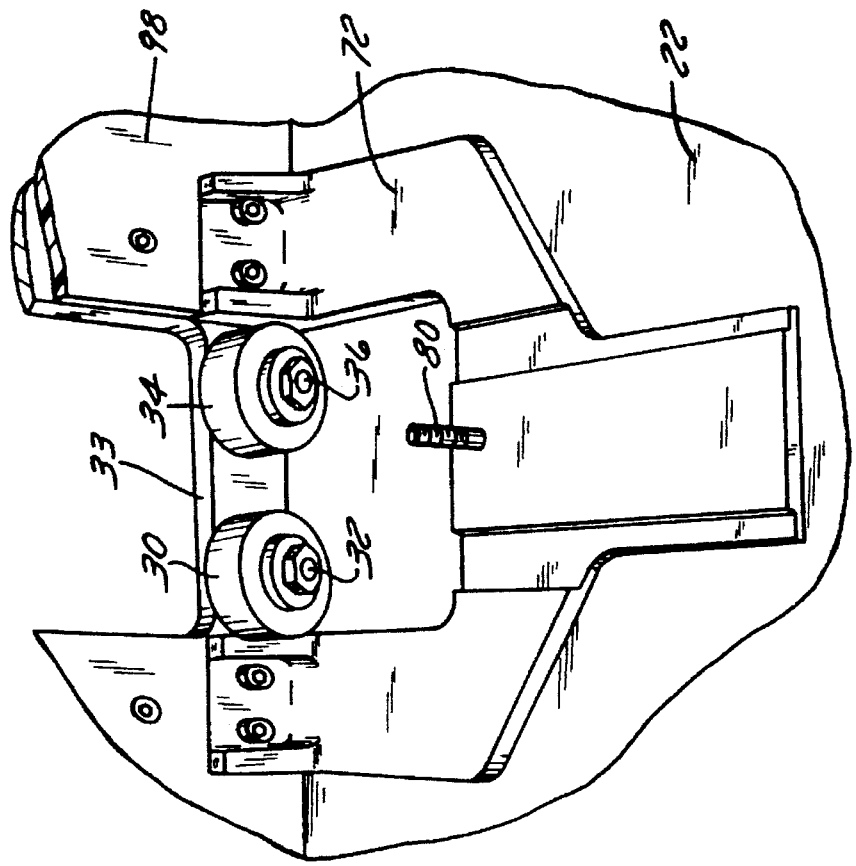
FIG. 5A
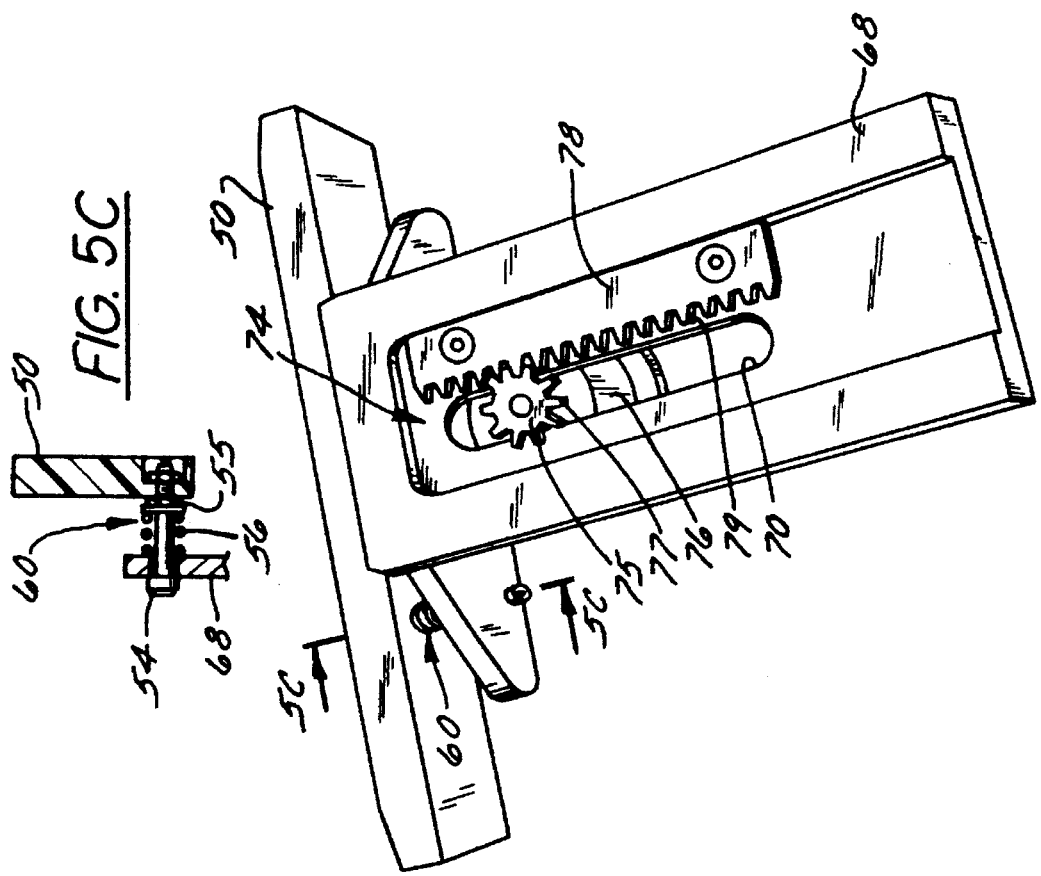
FIG. 5C
FIG. 5B

FEEDING DEVICE FOR CURVED WORKPIECES

BACKGROUND OF THE INVENTION

1. Field of the Invention

The present invention relates to feeding devices for wooden workpieces, and more particularly, relates to feeding devices for curved wooden workpieces.

2. Background of the Related Art

It is well known that shaping devices can be used to shape wooden workpieces into, for example, decorative wooden moldings. FIG. 1 illustrates a simple shaping device which has achieved almost universal acceptance in the woodworking industry and which is standard equipment found in most woodworking shops. Standard shaper 10 comprises a base unit, or base 11, and a vertically projecting cutting head 12. The shaper 10 further comprises a feeding device (not illustrated) for advancing the workpiece past the cutting head. The feeding device comprises a jig and preferably further comprises a means for automatically advancing the workpiece past the cutting head.

The jig guides the workpiece and maintains a specified spacial relationship between the cutting head 12 and the workpiece. The advancing means frequently comprise one or more motor driven rollers which automatically advance the workpiece through the jig. Until now, there has not been available a simple feeding device which can be used in conjunction with the shaper 10 and a wooden workpiece which is curved.

As illustrated in FIGS. 2A and 2B, a curved wooden workpiece 15 has lateral surfaces 16a, 16b, a top surface 17, and a bottom surface 18. The wooden surface further has a width W, a height H, and a curvature C. It is often desirable to be able to cut irregular outlines, such as an irregular outline 19, onto at least one of the lateral surfaces 16a, 16b of the workpiece 15. This may be desirable, for example, for the purpose of making arched doorways, circular windows, and other radial or elliptical shapes. Further, this ability is desirable now more than ever given the recent growth in the popularity of curved moldings.

It is known that devices can be made which are useful in the feeding of curved workpieces. Conventional feeding devices have suffered several disadvantages, however.

A first disadvantage of conventional feeding devices is that they can not be used in conjunction with standard shaper 10 and, as a result, the craftsperson is required to have two separate shaping devices. Conventional feeding devices for curved workpieces often require that the feeding device be purchased in conjunction with an entirely new shaping device which includes, along with the conventional feeding device, its own base and cutting head. For a craftsperson who already has a shaper 10, the cost of a new base unit and cutting head are duplicative and could be saved if the feeding device could be used in conjunction with the craftperson's standard shaper. Since there are a large number of craftspeople in the woodworking industry who already own a standard shaper 10, this is a problem that affects a significant percentage of feeding device users.

A second disadvantage of conventional feeding and shaping devices is that they often can be used only for curved pieces or only for straight pieces. As a result, the craftsperson is required to own and maintain two separate feeding devices. The fact that the craftsperson must use two separate feeding devices makes it even more likely that they will further own two separate shaping devices, as discussed above. In other words, they are likely to use a standard shaper 10 comprising a conventional feeding device for straight workpieces, and additionally use another shaper comprising a conventional feeding device for curved workpieces.

A third disadvantage of conventional feeding devices is that they are unduly complicated, given the purpose of cutting an irregular outline on a lateral surface of a curved piece of wood. They frequently comprise a control system (hydraulic, pneumatic or electrical), cutting heads mounted on cantilever arms, an excess of belts and pulleys, and other structures that introduce substantial complexity into the feeding device system. An unduly complicated feeding device is undesirable for several reasons. First, a complex feeding device is difficult and time-consuming to adjust for workpieces of different shapes and sizes, so that the downtime of the machine is substantial. Further, the increased complexity of the device increases the number of parts that comprise the device, and makes the device more expensive to manufacture. Finally, in a complicated device, even simple improvements become difficult to make. For example, it is often desirable in a feeding device comprising a plurality of rollers to motorize (i.e., make motor driven) at least one of the rollers so that the workpiece can be automatically advanced past the cutting head. However, when the feeding device comprises four or more rollers, a design decision must be made as to the number of rollers to motorize. If only one roller is motor driven, then the design challenge is to ensure that enough force is applied between the workpiece and the motor driven roller, so that a friction force can be imparted to advance the workpiece. If two rollers are motor driven, then the design challenge is to ensure that they are synchronized, so that the workpiece can advance smoothly past the cutting head. In short, complexity begets complexity, and a simpler feeding device is desirable.

A need therefore exists for a feeding device which can be used in conjunction with standard shaping devices, which can shape the lateral surfaces of both straight and curved wooden workpieces, and which is simple in construction.

SUMMARY OF THE INVENTION

A device for feeding a curved workpiece is presented. A shaping device incorporating a feeding device of the present invention comprises a base; a cutting head projecting vertically above the base for shaping the workpiece; and a jig mounted to the base for guiding the workpiece past the cutting head, the jig including first, second, and third rollers for providing a three point support for the workpiece.

Alternatively, the present invention may be described as a feeding device for feeding a workpiece through a shaping device having a vertically projecting cutting head and a base, comprising first, second and third rollers for feeding the workpiece past the cutting head and for providing a three point support for the workpiece; a horizontal guide which horizontally guides the workpiece through the feeding device; a horizontal adjustment mounted to the base and to the horizontal guide for adjusting the distance between the horizontal guide and the cutting head; and a vertical adjustment mounted to the base for adjusting the height of at least one of the rollers with respect to the base. Preferably, one of the rollers is motor driven to automatically advance the workpiece past the cutting head. Further, the feeding device is preferably vertically adjustable and horizontally adjustable.

In accordance with the present invention, a method of shaping a curved workpiece comprises the steps of arranging a three point vertical support and a horizontal guide so as to establish a predetermined spacial relationship between the workpiece and the cutting head; advancing the workpiece past a cutting head which is rotating about a vertical axis; and cutting an irregular outline into the workpiece as the workpiece advances past the cutting head.

A feeding device of the present invention has several advantages. A first advantage of a feeding device of the present invention is that it can be used in conjunction with a standard shaping device. A standard shaping device has a base and a vertically projecting cutting head, and most craftspeople in the industry own a standard shaping device. It is therefore less expensive for a craftsperson to upgrade existing equipment for use with a feeding device of the present invention. All that the craftsperson need purchase is the inventive feeding device; there is no need to purchase an entirely new base unit with cutting head.

A second advantage of a feeding device of the present invention is that it may be used with both straight and curved wooden workpieces. Hence, just as duplicative shaping devices are no longer necessary, so too are duplicative feeding devices no longer necessary. A feeding device of the present invention is not limited to only curved workpieces or to only straight workpieces; rather, a feeding device of the present invention can handle both types of workpieces. Again, the elimination of the need for duplicative machinery results in a cost savings to the craftsperson.

A third advantage of a feeding device of the present invention is that it has a simple design utilizing a three point support. The three point support is a flexible design which makes the feeding device easily adaptable to workpieces of different shapes and sizes, and thereby reduces downtime associated with processing those workpieces. A further advantage of using a three point support is that it makes a feeding device of the present invention readily adaptable to having a motor driven roller.

BRIEF DESCRIPTION OF THE DRAWINGS

FIGS. 2A and 2B illustrate a curved workpiece to be shaped using the present invention;

FIG. 3A is a perspective view of a feeding device of the present invention.

FIGS. 5A, 5B, and 5C illustrate a horizontal adjustment assembly of a feeding device of the present invention.

DETAILED DESCRIPTION OF THE PREFERRED EMBODIMENT

Figure 1:
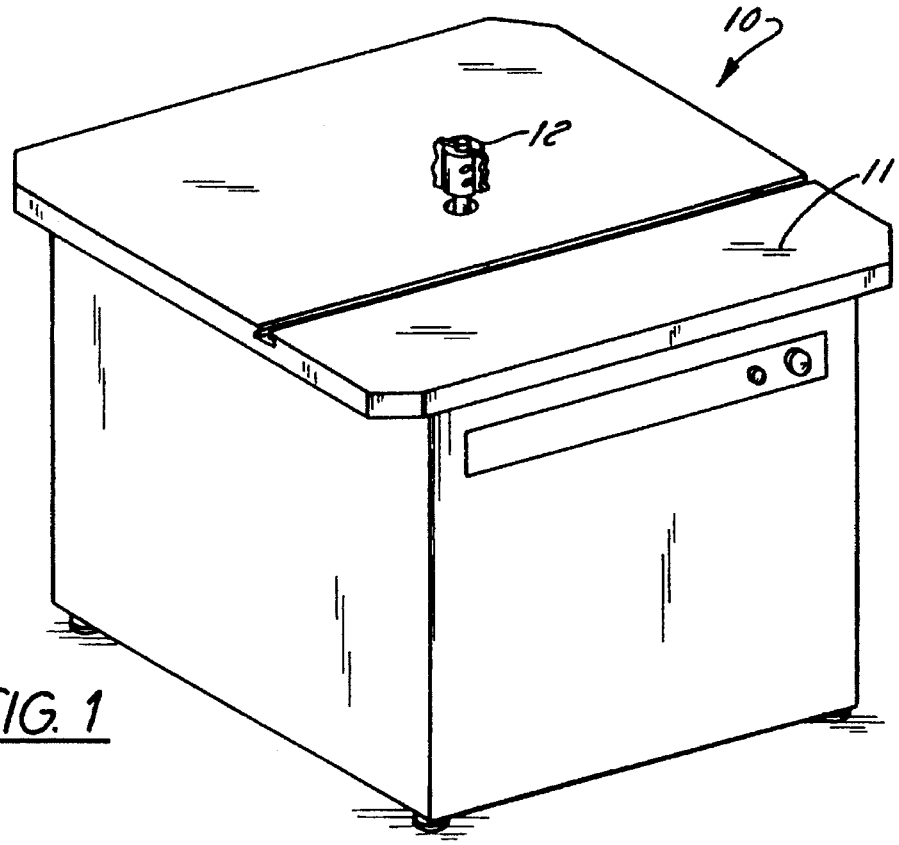
FIG. 1 illustrates a standard shaping device commonly used in the wood shaping industry.
Figure 3B:
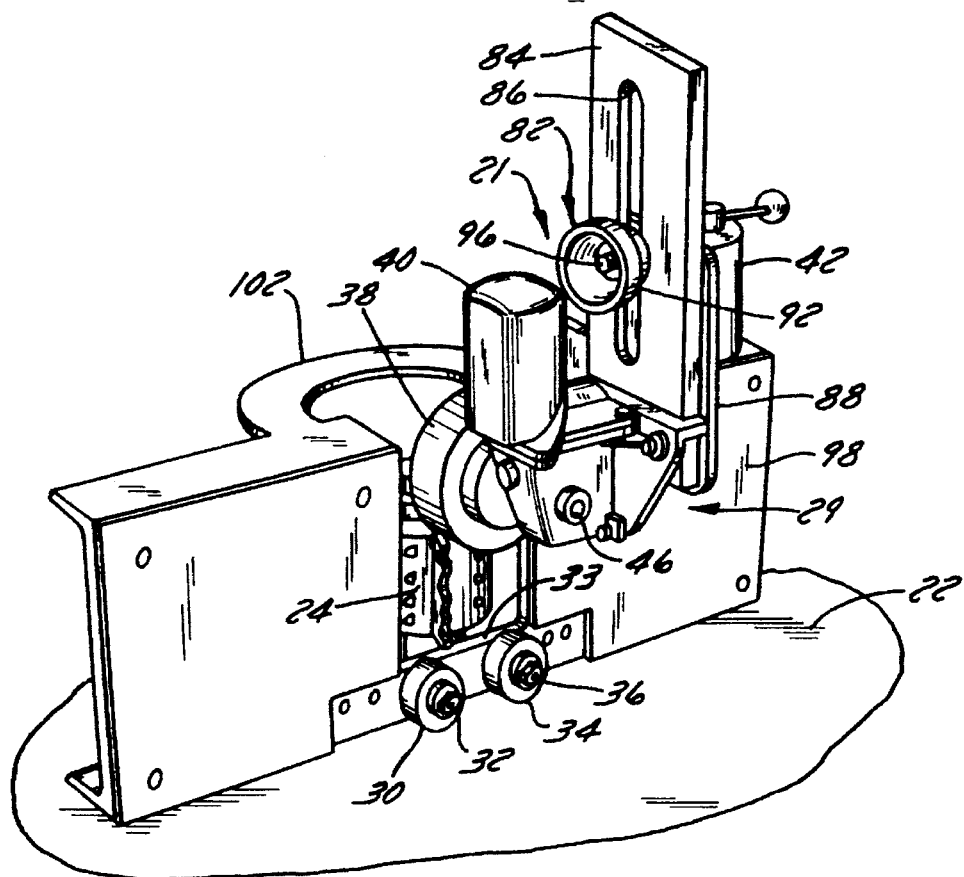
FIG. 3B is the same view but with the horizontal adjustment removed so as to more clearly illustrate the three point support.
Figure 4:
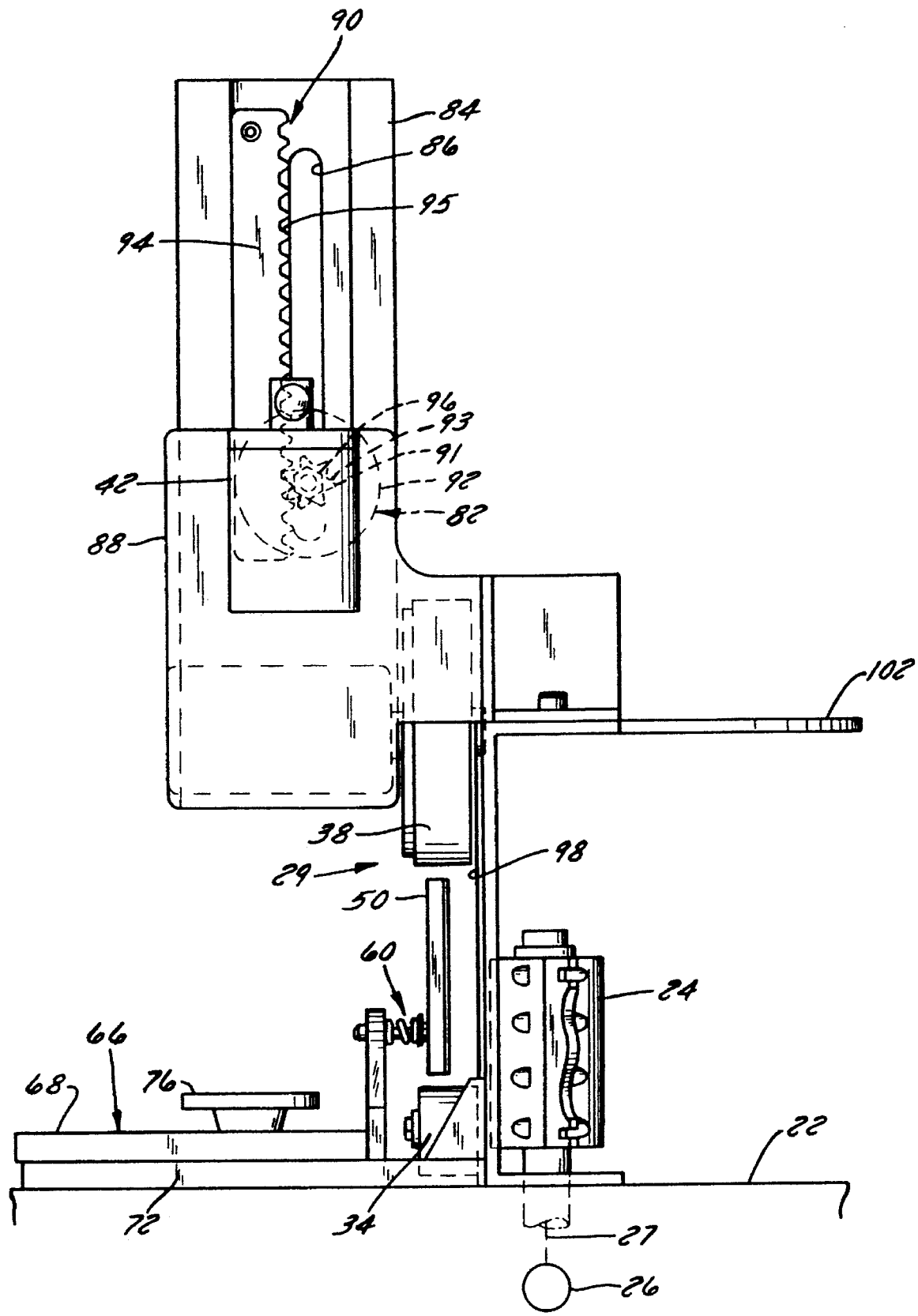
FIG. 4 is a side view of a feeding device of the present invention.

Referring now to FIG. 3, a feeding device 21 of the present invention is illustrated. The feeding device 21 is pan of a shaping device 20, which also comprises a base 22 and a cutting head 24. The feeding device 21 and the cutting head 24 are mounted to the base 22, and can be used to cut the irregular outline 19 into the curved workpiece 15. The cutting head 24 projects vertically above the base 22, and spins about a vertical axis of rotation. Cutting head 24 is connected to a cutting head motor 26 which causes the cutting head 24 to spin and thereby cut the workpiece 15.

The feeding device 21 of the present invention comprises a jig 28, which includes a three point vertical support 29 and a horizontal guide 50. The three point support 29 supports the weight of the workpiece 15 as the workpiece 15 advances past the cutting head 24. The guide 50 horizontally guides the workpiece 15 as it advances past the cutting head 24. Both the three point support 29 and the horizontal guide 50 establish a specific spacial relationship between the workpiece 15 and the cutting head 24.

Discussing first the three point vertical support 29, support 29 is formed by a first roller 30, a second roller 34, and a third roller 38. The support 29 supports the workpiece 15 as the cutting head 24 cuts one of its lateral surfaces 16a, 16b. (The workpiece 15 is inverted as it advances through the shaping device 20; as a result, the top surface 17 faces down upon rollers 30 and 34, while bottom surface 18 faces up and is engaged by roller 38.) Preferably, the support 29 is in the shape of an isosceles triangle with each of the three rollers 30, 34, 38 at different points or vertices of the isosceles triangle. In particular, the first roller 30 and the second roller 34 are preferably at the lower vertices of the isosceles triangle and define the base of the triangle. The third roller 38 is preferably placed at the vertex of the triangle, such that the equidistant legs of the triangle are defined by the combination of the rollers 38, 30 and by the combination of the rollers 38, 34.

Each of the three rollers 30, 34, 38 is rotatably mounted so as to spin about a horizontal axis. The first roller 30 is rotatably mounted to a shaft 32, which is in turn mounted to a shaft support member 33. Similarly, the second roller 34 is rotatably mounted to a shaft 36, which is in turn mounted to the shaft support member 33. The shafts 32, 36 each provide a horizontal axis of rotation for the rollers 30, 34, respectively. The shaft support member 33 is mounted to the base 22.

In the preferred embodiment, the third roller 38 is motor driven, so as to provide a means for automatically advancing the workpiece 15 through the jig 28, and past the cutting head 24. Motor driven roller 38 is connected to a motor 40 which drives the motor driven roller 38 and which has a shaft 27 that provides a horizontal axis of rotation for the roller 38. Motor 40 receives electrical power via a power supply cable (not illustrated), which is connected to a switch 42. The switch 42 controls the flow of electrical power to the motor 40, and preferably has both "forward" and "reverse" settings.

Discussing now the horizontal guide 50, the guide 50 is preferably mounted to a pair of biasing mechanisms 52, 60. The biasing mechanisms 52, 60 are further mounted to a movable member 68 of a horizontal adjustment assembly 66, as discussed below. The biasing mechanisms 52, 60 bias the horizontal guide 50 toward the cutting head 24. To do this, the biasing mechanisms 52, 60 each utilize an allen bolt 54, a nut 55, and a spring 56. The spring 56 exerts a force on the guide 50 which tends to drive the guide 50 towards the cutting head 24.

In the preferred embodiment, the jig 28 is horizontally adjustable (so that workpieces of different widths may be shaped) and vertically adjustable (so that workpieces of different heights and curvatures may be shaped). Discussing first horizontal adjustment, this is accomplished by adjusting the horizontal adjustment assembly 66. The horizontal adjustment 66 includes a fixed member 72, horizontally movable member 68, and a gear assembly 74. The fixed member 72 is mounted to the base 22.

The horizontal guide 50 is mounted to the movable member 68 via the biasing mechanisms 52, 60. The movable member 68 is movable with respect to the fixed member 72 so as to vary the distance between the horizontal guide 50 and the cutting head 24. Preferably, member 68 moves by sliding action; in other words, it is slidable.

The gear assembly 74 is mounted such that force applied to the gear assembly 74 causes the slidable member 68 to move with respect to the fixed member 72. In particular, the gear assembly 74 includes a rotating gear 75 mounted to a gear handle 76 and to the base 22 by a nut and bolt assembly 80. (The horizontally slidable member 68 has a slot 70 cut therein for the nut and bolt assembly 80 to fit through.) The nut and bolt assembly 80 further provides an axis of rotation for the rotating gear 75 when the assembly 80 is loosened. The gear assembly 74 further includes a straight gear 78 which is mounted to the horizontally slidable member 68. Teeth 77 of the rotating gear 75 match teeth 79 of the straight gear 78. Hence, when a force, and in particular a rotative force or torque, is applied to the rotating gear 75, the teeth 77 engage the teeth 79 and drive the slidable member 68 forward or backward.

Discussing now vertical adjustment, this is accomplished by adjusting a vertical adjustment assembly 82. The vertical adjustment 82 includes a fixed member 88, vertically movable member 84, and a gear assembly 90. The fixed member 88 is mounted to the base 22.

The third (motor driven) roller 38 is mounted to the movable member 84, and is movable with respect to the fixed member 88 so as to vary the height of the roller 38 with respect to the base 22. Preferably, member 84 moves by sliding action; in other words, it is slidable.

The gear assembly 90 is mounted such that force applied to the gear assembly 90 causes the slidable member 84 to move with respect to the fixed member 88. In particular, the gear assembly 90 includes a rotating gear 91 mounted to a gear handle 92 and to the fixed member 88 by a nut and bolt assembly 96. (The vertically slidable member 84 has a slot 86 cut therein for the nut and bolt assembly 96 to fit through.) The nut and bolt assembly 96 further provides an axis of rotation for the rotating gear 91 when the assembly 96 is loosened. The gear assembly 90 further includes a straight gear 94 which is mounted to the vertically slidable member 84. Teeth 93 of the rotating gear 91 match teeth 95 of the straight gear 94. Hence, when a force, and in particular a rotative force or torque, is applied to the rotating gear 91, the teeth 93 engage the teeth 95 and drive the slidable member 84 upward or downward.

In operation, an initial step is to arrange the three point vertical support 29 and the horizontal guide 50 so as to establish a predetermined spacial relationship between the workpiece 15 and the cutting head 24. By this it is meant that the jig 28 must be set up so that it can accommodate a workpiece of the size and shape of the workpiece that is desired to be cut, and so that the workpiece will be cut in the desired place and in the desired manner.

Horizontal adjustment is accomplished by adjusting the distance between the guide 50 and the cutting head 24. The cutting head 24 remains in a fixed position and is not adjustable. The horizontally slidable member 68 can be adjusted by using the horizontal adjustment 66, so that workpieces of various widths may be shaped. To horizontally adjust member 68, the nut and bolt assembly 80 are first loosened. Then, the gear handle 76 is rotated (clockwise to fit a narrower workpiece, counterclockwise to fit a wider workpiece). When the gear handle 76 is rotated, it imparts force on the straight gear 78, causing the straight gear 78 to move inward or outward. Since the straight gear 78 is mounted to the horizontally slidable member 68, the member 68 will accordingly move inward or outward. When the proper horizontal adjustment has been achieved, the nut and bolt assembly 80 is then retightened.

Vertical adjustment can be accomplished by adjusting the height of motor driven roller 38. The first roller 30 and the second roller 34 remain in fixed positions and are not adjustable. The motor driven roller 38 can be adjusted using the vertical adjustment 82 so that workpieces of various heights and curvatures may be shaped. Since the motor driven roller 38 is mounted to the vertically slidable member 84, the height of motor driven roller 38 can be adjusted by adjusting the height of the member 84. To vertically adjust the member 84, the nut and bolt assembly 96 are first loosened. Then, the gear handle 92 is rotated (clockwise to fit a taller workpiece, counterclockwise to fit a short workpiece). When the gear handle 92 rotates, it imparts force on the straight gear 94, causing the straight gear 94 to move upward or downward. Since the straight gear 94 is mounted to the vertically slidable member 84, the member 84 will accordingly move upward or downward. When the proper vertical adjustment has been achieved, the nut and bolt assembly 96 is then retightened.

It should be noted that the ability to shape both straight and curved workpieces is achieved through the use of vertical adjustment 82. In particular, straight workpieces can be shaped by adjusting the height of the roller 38 such that the vertical distance between the roller 38 and the roller 30 is equal to the width of the workpiece. As a practical matter, vertical adjustment for straight workpieces can be achieved by resting the workpiece across the rollers 30, 34 and lowering the roller 38 until it meets the workpiece.

After the three point support 29 and the horizontal guide 50 have been properly arranged, the workpiece 15 is advanced past the cutting head 24 which is rotating about a vertical axis. Preferably, the advancement is performed automatically by a motor driven member of the three point support, and in particular, by the motor driven roller 38. The motor driven roller 38 starts spinning when a user moves the switch 42 to the "forward" position. The cutting head starts spinning when a switch (not illustrated) on the base 22 of the shaping device 20 is set to the "on" position. The workpiece is then fed into the space between the first roller 30 and the motor driven roller 38. Friction force imparted by the motor driven roller 38 to the workpiece causes the workpiece to advance forward through the shaping device 20.

As the workpiece 15 advances past the cutting head 24, the irregular outline 19 is cut into the workpiece 15. The shape of the irregular outline 19 will depend on the shape that has been manufactured onto the outer surface of cutting head 24. Hence, different irregular outlines can be achieved by using different cutting heads.

As should be apparent from the preceding discussion, many of the advantages of the present invention flow from the fact that it uses a three point vertical support 29. The three point vertical support 29 is a simple, flexible design which supports the weight of the workpiece as a lateral surface of the workpiece is being cut. The support is flexible enough that, by adjusting the vertical height one the rollers (i.e., the third, motor driven roller), workpieces of various curvatures including straight workpieces can be shaped. Further, the three point support is easily adapted to having an automatic advancement means built into the jig. In short, a feeding device of the present invention can be used in conjunction with standard shaping devices, it can shape the lateral surfaces of both straight and curved wooden workpieces, and it is simple in construction.

Modifications may be made to the present invention. For example, the present invention may further comprise safety devices such as a shield 98 or a guard 102. It is to be understood that these and other embodiments of the present invention not disclosed herein are fully intended to be within the scope of the appended claims.

We claim:

1. A shaping device for shaping a curved workpiece, the shaping device comprising:

a base;

a cutting head projecting vertically above the base for shaping the workpiece; and a jig mounted to the base for guiding the workpiece past the cutting head, said jig including first, second, and third rollers for providing a three point support for the workpiece, wherein the first roller spins about a first horizontal axis, the second roller spins about a second horizontal axis, and the third roller spins about a third horizontal axis.

2. The device as in claim 1, wherein at least one of the first, second, and third rollers is motor driven to automatically advance the workpiece past the cutting head.

3. The device as in claim 1, wherein the first and second roller are substantially equidistant from the third roller.

4. The device as in claim 1, further comprising a horizontal guide which horizontally guides the workpiece through the jig, wherein the horizontal guide is mounted to a horizontal adjustment which is further mounted to the base.

5. The device as in claim 4, wherein the horizontal adjustment comprises:

a fixed member mounted to the base;

a movable member mounted to the horizontal guide, the movable member being movable with respect to the fixed member so as to vary the distance between the horizontal guide and the cutting head; and a gear assembly mounted to the fixed member and the movable member, the gear assembly being mounted such that force applied to the gear assembly causes the movable member to move with respect to the fixed member.

6. The device as in claim 5, wherein the jig further comprises a biasing mechanism mounted between the movable member and the horizontal guide for biasing the horizontal guide toward the cutting head.

7. The device as in claim 1, further comprising a vertical adjustment for adjusting the height of at least one of the rollers, the vertical adjustment including a fixed member mounted to the base;

a movable member mounted to the at least one roller, the movable member being movable with respect to the fixed member so as to vary the height of the at least one roller with respect to the base; and a gear assembly mounted to the fixed member and the movable member, the gear assembly being mounted such that force applied to the gear assembly causes the movable member to move with respect to the fixed member.

8. A feeding device for feeding a workpiece through a shaping device having a vertically projecting cutting head and a base, the feeding device comprising:

first, second, and third rollers for feeding the workpiece past the cutting head and for providing a three point support for the workpiece;

a horizontal guide which horizontally guides the workpiece through the jig;

a horizontal adjustment mounted to the base and to the horizontal guide for adjusting the distance between the horizontal guide and the cutting head; and a vertical adjustment mounted to the base for adjusting the height of at least one of the rollers with respect to the base.

9. The device as in claim 8, wherein at least one of the rollers is motor driven to automatically advance the workpiece past the cutting head.

10. The device as in claim 8, wherein the first and second roller are substantially equidistant from the third roller.

11. The device as in claim 8, wherein the first roller spins about a first horizontal axis, the second roller spins about a second horizontal axis, and the third roller spins about a third horizontal axis.

12. The device as in claim 8, wherein the horizontal adjustment includes:

a fixed member mounted to the base;

a movable member mounted to the horizontal guide, the movable member being movable with respect to the fixed member so as to vary the distance between the horizontal guide and the cutting head; and a gear assembly mounted to the fixed member and the movable member, the gear assembly being mounted such that force applied to the gear assembly causes the movable member to move with respect to the fixed member.

13. The device as in claim 12, wherein the jig further comprises a biasing mechanism mounted between the movable member and the horizontal guide for biasing the horizontal guide toward the cutting head.

14. The device as in claim 8, wherein the vertical adjustment includes:

a fixed member mounted to the base;

a movable member mounted to the at least one roller, the movable member being movable with respect to the fixed member so as to vary the height of the at least one roller with respect to the base; and a gear assembly mounted to the fixed member and the movable member, the gear assembly being mounted such that force applied to the gear assembly causes the movable member to move with respect to the fixed member.

15. A method of shaping a curved workpiece, the method comprising the steps of:

arranging a three point vertical support and a horizontal guide so as to establish a predetermined spacial relationship between the workpiece the cutting head;

advancing the workpiece through the three point vertical support and past a cutting head which is rotating about a vertical axis; and cutting an irregular outline into the workpiece as the workpiece advances past the cutting head.

16. The method as in claim 15, further comprising activating a motor driven member of the three point support to advance the workpiece through the three point vertical support.

17. The method as in claim 15, further comprising the step of varying the horizontal distance between the horizontal guide and the cutting head.

18. The method as in claim 16, further comprising the step of varying the vertical height of the motor driven member of the three point support.

\* \* \* \* \*